L. W. GREVE.
FLUID OPERATED TOOL.
APPLICATION FILED JUNE 24, 1916.
1,241,962. Patented Oct. 2, 1917.
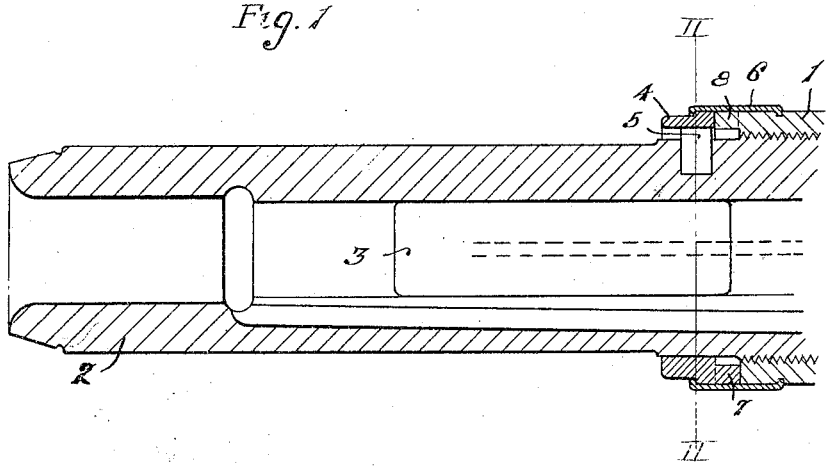
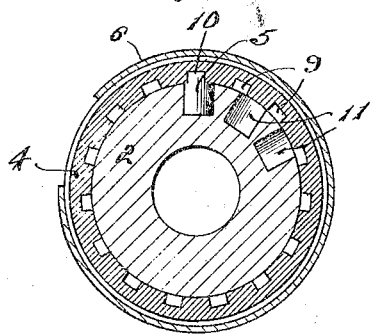
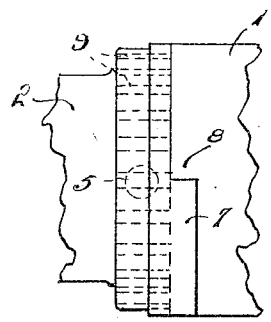

UNITED STATES PATENT OFFICE

LOUIS W. GREVE, OF CLEVELAND, OHIO, ASSIGNOR TO THE CLEVELAND PNEUMATIC TOOL COMPANY, A CORPORATION OF OHIO.

FLUID-OPERATED TOOL.

1,241,962.      Specification of Letters Patent.      Patented Oct. 2, 1917.

Original application filed January 7, 1916, Serial No. 70,785. Divided and this application filed June 24, 1916. Serial No. 105,772.

*To all whom it may concern:*

Be it known that I, LOUIS W. GREVE, a citizen of the United States, residing at Cleveland, in the county of Cuyahoga and State of Ohio, have invented certain new and useful Improvements in Fluid-Operated Tools, of which the following is a specification.

The invention relates to fluid operated tools, the present application being a division of my pending application Serial No. 70,785, filed January 7, 1916, and has for its primary objects: the provision of improved locking means for securing the handle and body portion, or any two separate portions of the device from accidental unscrewing or loosening; the provision of a locking device of the character specified which can be readily applied and adjusted and which is capable of a very fine adjustment whereby the parts can be locked at any position, and the exact position, in which the parts are screwed together with the proper degree of tightness. One embodiment of the invention is illustrated in the accompanying drawings, wherein—

Figure 1 is a cross-section taken through the forward portion of a fluid operated tool embodying the invention; Fig. 2 is a section on the line II—II of Fig. 1; and Fig. 3 is a partial side elevation of the apparatus at the point of connection between the handle and cylinder casings, but with the snap ring removed.

The parts shown are as follows; 1 is the forward end of the handle casing; 2 is the cylinder casing screw-threaded into the handle casing; 3 is the hammer piston; 4 is the locking ring for preventing accidental unscrewing of the cylinder casing and handle casing; 5 is the locking pin for preventing rotation of the locking ring; and 6 is the snap ring for holding the locking ring against longitudinal movement.

The edges of the locking ring 4 and the handle are provided with opposing projections 7 and 8, each extending around 180 degrees, so that relative rotative movement is prevented when the locking ring is in operative position. The inner surface of the locking ring is provided with a plurality of longitudinal slots 9, and the cylinder casing carries the removable pin 5 whose outer end 10 is formed with flattened sides and eccentric with respect to the body of the pin and adapted to engage one of the slots 9. The elongated flattened end engaging the slot prevents the pin turning on its axis. The plurality of holes 11 for the pin 5 are provided so that it may be adjusted circumferentially of the cylinder casing. As indicated in Fig. 2 these holes are spaced with respect to the slots 9 in the ratio of 3 to 4, so that leaving aside the matter of the eccentric arrangement of the end of the pin, it is necessary to rotate the ring only one-half the distance between two of the slots 9 in order to secure a second connection between the pin and the ring. For instance, if it were necessary to rotate the ring clock-wise half the distance between two slots 9, the pin 5 would give this adjustment if shifted to the hole to the right of the one which it now occupies. The eccentric arrangement of the end 10 also increases the fineness or range of the adjustment. The two sets of adjustment together divide the spaces between the slots 9 to such an extent that the ring 4 can be made to interlock both with the handle and with the cylinder casing when the parts are screwed tight. The snap ring 6 is open at one side as indicated in Fig. 2, and has one flanged edge in engagement with a groove in the handle and the other with a shoulder on the locking ring 4.

It will be seen that the foregoing arrangement provides for the secure locking of the two casing parts in any desired position of adjustment, that the parts may be very readily assembled and disassembled, and that the fineness of adjustment is such that the parts may be locked when the threads come to a position of tight engagement. Other advantages incident to the construction will be readily apparent to those skilled in the art.

What I claim is:

1. In a fluid operated tool, a casing in two parts screwed together, a locking ring movable longitudinally of the parts having its inner surface provided with spaced longitudinal grooves and interlocking with one of the parts when in one extreme of movement so that relative rotation of such part and the ring is prevented, a plurality of pin sockets arranged circumferentially of the other casing part and having a spacing different from that of the said grooves, a pin adapted to fit any one socket and project above the surface of the casing part and engage one of the said grooves on the inner surface of the ring, and releasable securing means for holding the ring in locking position.

2. In a fluid operated tool, a casing in two parts screwed together, a locking ring movable longitudinally of the parts having its inner surface provided with spaced longitudinal grooves and interlocking with one of the parts when in one extreme of movement so that relative rotation of such part and the ring is prevented, a plurality of pin sockets arranged circumferentially of the other casing part and having a spacing different from that of the said grooves, a pin adapted to fit any one socket and project above the surface of the casing part and engage one of the said grooves on the inner surface of the ring, and releasable securing means for holding the ring in locking position, the said pin having its outer end eccentric with respect to the body of the pin.

LOUIS W. GREVE.